United States Patent [19]

Doll et al.

[11] Patent Number: 4,804,254

[45] Date of Patent: Feb. 14, 1989

[54] ARRANGEMENT IN A DISPLAY OR INSTRUMENT BOARD

[75] Inventors: Werner Doll, Tamm, Fed. Rep. of Germany; Thor G. Kamfjord; Jan E. Marthinsen, both of Sandefjord, Norway

[73] Assignee: Autodisplay A/S, Sandefjord, Norway

[21] Appl. No.: 104,866

[22] PCT Filed: Jan. 27, 1987

[86] PCT No.: PCT/NO87/00010

§ 371 Date: Sep. 28, 1987

§ 102(e) Date: Sep. 28, 1987

[87] PCT Pub. No.: WO87/04556

PCT Pub. Date: Jul. 30, 1987

[30] Foreign Application Priority Data

Jan. 27, 1986 [NO] Norway .................................. 860274

[51] Int. Cl.$^4$ ................................................. G02F 1/13
[52] U.S. Cl. .................................. 350/344; 350/331 T
[58] Field of Search .................... 350/331 T, 344, 332

[56] References Cited

U.S. PATENT DOCUMENTS

| | | | |
|---|---|---|---|
| 4,008,564 | 2/1977 | Luce et al. | 350/332 |
| 4,148,128 | 4/1979 | Feldman | 350/344 |
| 4,458,988 | 7/1984 | Pettersen | 350/344 |
| 4,470,668 | 9/1984 | Inoue et al. | 350/343 |
| 4,603,947 | 8/1986 | Baeger et al. | 350/344 |
| 4,626,073 | 12/1986 | Amstutz et al. | 350/344 |
| 4,662,719 | 5/1987 | DiMaria et al. | 350/332 |
| 4,685,769 | 8/1987 | Fukuma et al. | 350/332 |
| 4,685,770 | 8/1987 | Baeger | 350/344 |
| 4,705,360 | 11/1987 | Funada et al. | 350/344 |

FOREIGN PATENT DOCUMENTS 3046079 7/1982 Fed. Rep. of Germany .
3104668 9/1982 Fed. Rep. of Germany .
3120601 12/1982 Fed. Rep. of Germany .
3237407 4/1983 Fed. Rep. of Germany .
3324946 1/1984 Fed. Rep. of Germany .
149261 5/1983 Norway .

OTHER PUBLICATIONS

"LCD-Terminals of Norway" (brochure), ASK LCD A/S, Fredrikstad, Norway, 4 pages.
"Modular LCD-Displays" (brochure), EMBLA A/S (Information Displays of Norway), Drammen, Norway, 4 pages.
"Total Visual Driver Information Through One Free Graphic Display", (brochure), Auto Display A/s, Sandefjord, Norway, Jan. 28, 1986.
"Dynospheres News", Nos. 1-1985, 2-1985, Dyno Particles A/S, Lillestrom, Norway, 1985, pp. 1-4, 1-8.

Primary Examiner—Stanley D. Miller
Assistant Examiner—Anita E. Pellman
Attorney, Agent, or Firm—Holman & Stern

[57] ABSTRACT

An arrangement in a display or instrument board of the LCD kind, e.g. for use in a car, with said board (10;11) being provided with a matrix network of electrodes (4) for forming arbitrary desired displays all over the visible face of said board. A micro processor (15) is connected to said LCD board to be able to present displays as mentioned, selectively on said board on the basis of information from data suppliers (12-14, 16-19). Said board is flexible due to utilization of monodisperse plastic spheres as a spacer medium, with the remaining layers (1,2,3) provided on each side of plastic spheres (5) and the LC liquid (6) consisting of a flexible material, e.g. plastic sheet or plastic film. Said plastic spheres may be provided with an adhesive-like coating that is curable, so that said plastic spheres are bound to said layers, and the LCD board receives a desired appearance and curvature(s).

1 Claim, 3 Drawing Sheets

ARRANGEMENT IN A DISPLAY OR INSTRUMENT BOARD

CROSS REFERENCE TO RELATED APPLICATION(S)

This U.S. application stems from PCT International Application No. PCT/NO87/00010 filed Jan. 27, 1987.

The present invention relates to an arrangement in a display invention relates to an arrangement in a display or instrument board of the LCD kind, preferably for use in a coach, or similar vehicles, or other installations. It is previously known to use instrument boards of the LCD kind, among others in private cars with said LCD display provided with a fixed electrode pattern to display fixed images and/or in fixedly defined segments which are controllable, e.g. to show the gradually increasing speed of the car, if desired, in the form of dot matrixes permitting curves to be drawn by the aid of electronic means to show the relation between operative parameters. Also, displays were previously disclosed with said methods in combined arrangements.

Previously disclosed inventions are based on plane parallel wafers having a LC liquid an another spacer means between said wafers to maintain the plane parallel arrangement in large display areas.

An essential disadvantage of this kind of LCD displays in connection with cars is that they have to be specially made, and that the amount of information that may be presented on the display is very limited, which latter fact is not the least important disadvantage.

The requirement of a plane parallel arrangement represents an essential disadvantage in displays to be used as instrument boards in cars and the like, both because this imposes limitations on the design, and because a plane shape is unfortunate as regards reflections from light in the surroundings.

In cars of recent design information is displayed to an increasing degree via the dash board of the car. Some instruments may be difficult to read, whereas other instruments only present information of interest in case of a crisis arising or being imminent.

There is, thus, a demand for providing a display or instrument board in connection with, especially cars or the like, which may have a curved surface with a radius of curvature that may be selected, which display or instrument board can yield the information necessary for driving, and can, at the same time provide information that is necessary when a crisis or a dangerous situation arises or is imminent, or other secondary information that may be of use to the driver of the vehicle.

According to known technology glass fibres are mainly used for spacer material in the cell gap in LCD boards. If flexible LCD-boards or cells are desired, glass fibres cannot be used for spacer material because glass fibres may break if the cell is flexed. The sharp-edged material may then damage the orienting layer or cause short-circuits between both wafers In all these cases the optical appearance of the display will be impaired or even destroyed.

Contrary to rigid cell walls, flexible cell walls require considerably more spacer material, especially for displays as mentioned above which have a large area, e.g. 350×350 mm, to maintain the cell gap constant within narrow limits. A spacer material of high density is, thus, necessary. Glass fibres may not be used when high density is required because it will be impossible to avoid that fibres extend across each other. This will cause a larger cell gap, or if the cell wafers are compressed when sealed fibres may break and the sharp-edged portions will cause the difficulties mentioned above.

High density of glass fibres will also impair the optical appearance of transmission in the off-condition because fibres having a diameter between 6 and 10 μm have a length of 30-60 μm, i.e. they are visible.

All mentioned disadvantages of the previously known spacer material may be avoided with use of mono-disperse plastic spheres, e.g. "Dynospheres®", and such mono disperse plastic spheres may, especially, be provided over a large area. Spheres having a diameter of e.g. less than 10 μm will remain invisible to the naked eye, in contrast to glass fibres having the same diameter An improvement as to the total stability of a flexible LCD-cell may be achieved if said mono disperse plastic spheres, especially of the kind known as "Dynospheres®", produced by Dyno Particles A/S, Norway, are modified so as to have their surface coated by an adhesive-like coating which can be thermohardened, or hardened chemically or by radiation. This means, that after the wafers are mounted together, and before the liquid crystal (LC) material is introduced, said spacer material is hardened in this manner to provide a rigid connection between the front and rear wafer of the LCD cell or display. An essential disadvantage of the known LCD-boards is due to the fact that the optical appearance, i.e. the contrast ratio, response period, and color are dependent on temperature. Especially for a broad range of temperatures (−40° to +90° C.), being necessary to satisfy the requirements, e.g. in connection with vehicles, e.g. cars or coaches, the appearance is optimized for the mean range of temperature and will change for the worse in case of low or high temperatures. The contrast ratio is defined as the ratio between on-condition transmission and off-condition transmission. For off-condition of LCD, based on twisted-nematic TN-LCD, transmission shows a minimum if the following equation is fulfilled:

$$T_{av} = \frac{\sin^2 \sqrt{v(1+u^2)^{\frac{1}{2}}}}{1+u^2}$$

wherein $$u = \frac{\pi \cdot d \cdot \Delta n}{v \cdot \lambda}$$

$T_{av}$ = off-condition transmission
$v$ = twisting angle
$d$ = cell gap (distance) (μm)
$\lambda$ = wave length (μm)
$\Delta n$ = anisotropy of the index of refraction of the LC material.

The twisting angle λ and wave length λ may be considered to be firm parameters of the display unit. Variables are, thus, only d and Δn. Especially n will change dependent on temperature ($\Delta n \approx 1$ = temperature), i.e. Δn will increase if temperature, e.g. falls. The cell gap is constant, and the equation is, thus, no longer fulfilled, and the off-condition transmission is higher, meaning that the contrast ratio is lower.

Utilization of mono disperse spheres which are not rigid, but resilient, e.g. modified "Dynospheres®" may cause the product of d.Δn to be kept constant, which, in turn, means that off-condition transmission may be kept on a minimum all over the range of temperature, and contrast will, thus, be at maximum. According to the present invention said instrument or display board is, thus, produced by the aid of insulating, flexible wafers which are kept equidistant by the aid of monodisperse plastic spheres..Monodisperse plastic spheres, e.g. of the kind "Dynospheres ®" fulfill the requirement for accuracy of dimensions in case of an absolute diameter in the region of 1-10 μm being the actual distance in such boards.

Also, it is proposed according to the present invention that the electrode pattern on the inside of said wafer or sheet forms a matrix pattern with every single dot of said matrix being available for display independently of all other dots, permitting arbitrary images to be formed on the display in the same manner as on a graphic display, and permitting such images to be changed dynamically on a given board. Said board will, thus, at one moment be able to show conventionally designed motor car instruments, and at the next moment, e.g. show a road map or a pure text, or an important combination of the latter.

Utilization of flexible sheet for so large areas requiring very large density and homogeneous distribution of the spacer material, the invention comprises methods for attaching said monodisperse spheres to both sheet.

The range of temperature of such displays in cars being from −40° to +90° C., poor adaption between the coefficient of expansion of the LC-liquid, its index of refraction, and the spacer material might cause a reduced contrast in certain temperature intervals. According to the invention a principle of compensation, based on adaption of the coefficient of expansion of the monodisperse spheres, is used, as well as an adapted reversible deformability of said spheres to optimize and to prevent formation of vacuum bubbles.

According to a further feature of the invention control electronics or part of such electronics for the board may consist of electronic integrated circuits mounted on the inside or outside of both sheet, with contacts for connection with any external electronics. This is desirable, and probably necessary because with a completely free graphic display of this size and with a desired density of dots (more than 100,000 dots), more than 1000 connections would otherwise be necessary which would represent an undesirable source of errors, and a very cost increasing element in production.

The invention also comprises a micro processor with an associated program and data store, as well as necessary adaption to electrical signals and, possibly, switches and keys from the vehicle, and equipment belonging to the vehicle.

As mentioned above, it will be suitable according to the invention to use resilient monodisperse plastic spheres to adapt the dependency on temperature of the liquid crystal material to achieve a homogeneous optical appearance of the LCD board over a large range of temperatures, e.g. from −40° to +90° C. Said monodisperse plastic spheres have their surface covered by an adhesive-like coating that is curable. A flexible LCD-cell wafer or both wafers preferably consist of polarizing plastic sheet or film, which is at least on one side covered by translucent electroconductive electrodes.

Said micro processor(s) may be arranged in connection with a number of data generators, e.g. sensors, scanners, data stores in order to enable the board to present the desired information selectively. Data generators that may be used are e.g. mechanical, electromechanical, thermal, optical, electro-optical, capacitive and/or inductive scanners. Furthermore, data generators to be used may be, e.g. tape players, compact discs(CD), radio, if desired with an information decoder, mobile telephone, and staff locators.

The features characterizing the above mentioned device will appear from the following claims.

The invention will now be disclosed in more detail with reference to the enclosed drawings, and it is to be understood that what is shown and described should only serve to illustrate the invention, but must not be regarded as limiting the invention.

Figure 1:
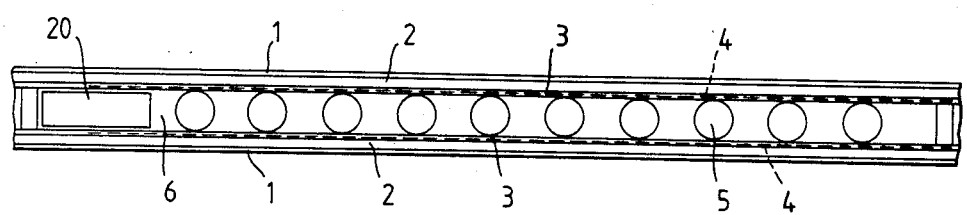
FIG. 1 illustrates a considerably enlarged cross section of a LCD display.

FIG. 1 shows how a LCD display, preferably of the flexible kind, can be laminated onto a plastic film 2, or that polarizer 1 and film 2 of the LCD display are produced as a unit. In connection with a car it may be suitable to make the display transmissive. If this is not demanded a reflector (totally reflecting or partly reflecting) (not shown) may be provided behind one polarizer filter 1. Reference number 3 designates orientation layers, whereas reference number 4 designates matrix electrodes, i.e. electrodes not associated with quite fixed images of the LCD display, like those of conventional LCD displays. Reference number 5 designates monodisperse plastic spheres forming spacers, e.g. "Dynospheres ®". or the like. Reference number 6 designates the LC-liquid.

In case a reflector (not shown) is used on one side of the display incident light, and reflected light, as well as the line of vision will be on the opposite side of said LCD display. If the display is transflective (partly reflecting) illumination from the rear will contribute to increased brightness.

It is shown, purely diagrammatically, how e.g. electronic circuits 20 may be mounted between films, or on their outside. For clarity this is however, not shown in FIG. 5. The pattern of circuits 4 on said two films may be provided in such a manner that, together, they form a matrix of uniform condensers which will form the desired, arbitrary images when selectively charged. According to the present invention the monodisperse plastic spheres will, furthermore, be reversibly deformable and have a coefficient of expansion that is adapted to the index of refraction of the LC-liquid.

As shown the spacer material used between said flexible films is preferably monodisperse plastic spheres, e.g. modified "Dynospheres ®" which, in addition to what is mentioned above, have a further advantage as compared to a rigid spacer material, e.g. glass fibres. Due to increased density of the LC-liquid at low temperatures, so called vacuum bubbles may occur which is detrimental to the optical appearance of the display.

The following approaches were recommended to overcome this problem, even though they cannot readily be included in a production line, viz. a small duct leading to an area of the cell that is separated from the visible portion, and which does not contain any LC material and will act as an expansion unit. It is, however, impossible completely to prevent vacuum bubbles from occurring spontaneously in an area far from the expansion unit. Alternatively, it was suggested to use areas which do not contain any spacer material. There, the cell wafers show limited flexibility—they breathe—and, thus, compensate for the negative pressure in the cell at low temperatures.

None of these approaches can, however, be used in large dot matrix displays because areas which are invisible in the final display unit are required. Especially in flexible LCD displays or cells having a large area, thus, a combination of flexible plastic spheres and those covered by an adhesive-like coating will be useful, according to the present invention.

With the present device in the shape of a liquid crystal (LC) display system with flexible cell wafers and monodisperse plastic spheres used as spacer material for the cell gap, a freely programmable LCD display is achieved which can be curved as desired to provide a large display area, e.g. 350×350 mm.

Said flexible monodisperse plastic spheres are, inter alia, used for adapting the temperature dependence of the LC material or liquid 6, in order to achieve a homogeneous optical appearance over a large temperature range, e.g. from $-40°$ to $90°$ C., which is a realistic temperature range, e.g. for cars, coaches, or other vehicles.

In order to achieve a rigid connection between said two cell wafers or plastic films the monodisperse plastic spheres 5 have their surface coated with an adhesive-like coating that can be thermally or chemically cured, or cured by radiation. Either one or both flexible wafers 2 may consist of polarizing film which, at least on one side is covered with translucent electroconductive electrodes 4.

Figure 5:
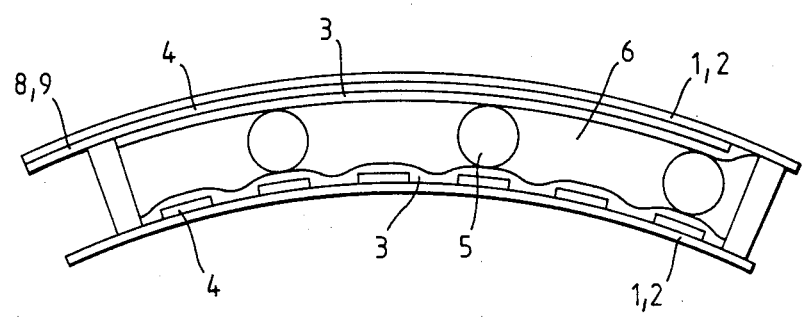
FIG. 5 illustrates a flexible LCD-cell or display in a curved state.

In FIG. 5 it is illustrated, at a larger scale than that of FIG. 1, how the LCD cell or display may be curved. In the orienting layer the matrix electrodes are embedded, as well as terminals 8, 9 leading to the horizontal and vertical, respectively, portion of matrix 4 of the LCD display. The film 2 and, if desired, polarizers 1 of the LCD display may, if desired, be produced as a unit, as shown in FIG. 5. Reference number 5 designates the monodisperse plastic spheres and reference number 6 designates the LC liquid.

Figure 2:
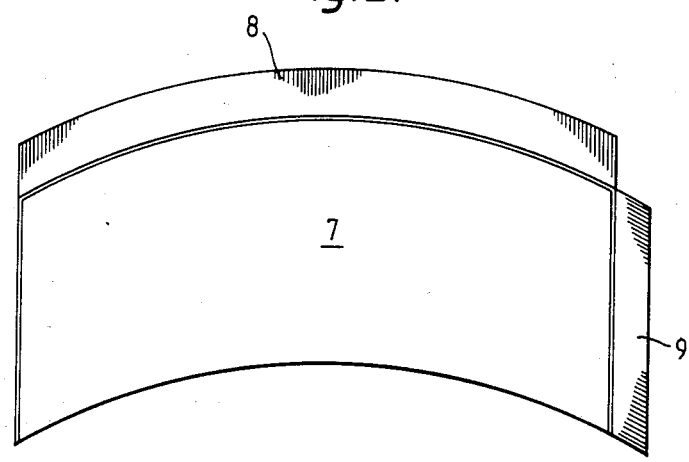
FIG. 2 illustrates a flexible LCD display.

In FIG. 2 a flexible LCD display 7, e.g. of the kind as appears from FIG. 1, is illustrated with terminals 8 and 9 provided for the horizontal and vertical, respectively, portion of matrix 4 of the LCD display.

Figure 3:
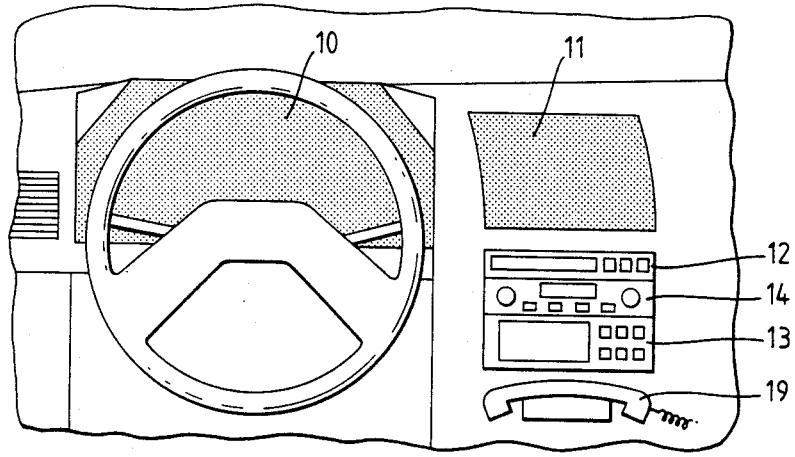
FIG. 3 illustrates LCD displays in connection with a private car, and with examples of data generators.

The interior of a car, as shown in FIG. 3, is provided with a LCD display 10 and, possibly, an additional display 11, with LCD display 10 arranged immediately in front of the driver's seat in the conventional position of instruments, e.g. speedometer, oil pressure gauge, etc. In addition to data generators, as e.g. sensors/scanners, data feeders, e.g., in the shape of a compact disk (CD) player 12, a radio 14 with an information decoder, if desired, a band player 13, and possibly a mobile telephone 19 may be provided. It will be understood that said units 12, 13, 14, and 19 may also be used for their primary purpose, e.g. entertainment or communication, respectively, when one is driving.

Figure 4:
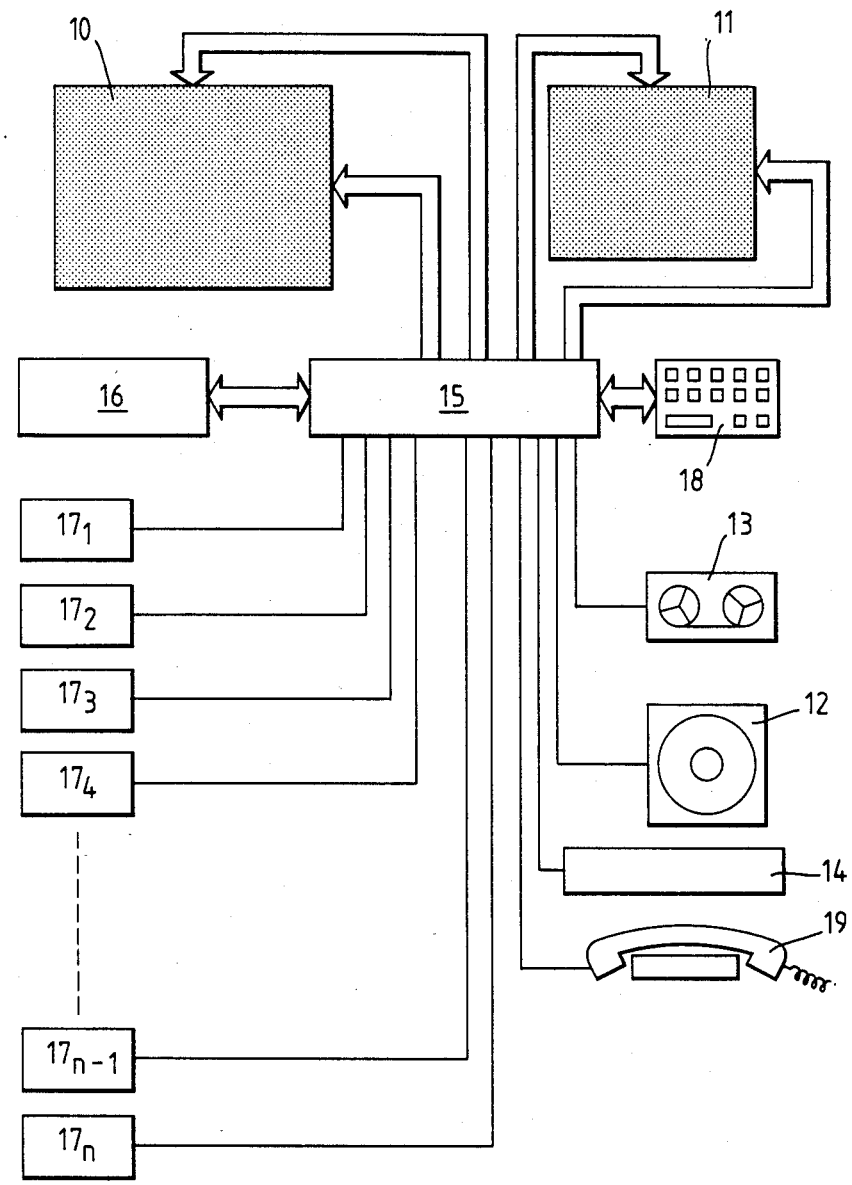
FIG. 4 is a block diagram of the device according to the invention.

The invention is now disclosed in more detail with reference to FIG. 4, showing a micro processor 15 as well as a memory 16 with the latter being in two-way connection with said micro processor 15. Said micro processor 15 is provided with means of control for LCD display 10, and possibly display 11. Micro processor 15 is connected with a control panel 18 which may be a two-way operating control panel, and may be manual or voice operated. Control panel 18 may, if desired, be arranged in such a manner that the micro processor indicates on the control panel which actuating member is to be operated or to what degree said micro processor carried out the instructions given.

Band player 13 may supply micro processor 15 with desired information, e.g. the information which it is desired to show on one or both displays 10, 11, the variable data in connection with what is to be shown being supplied by scanners 17. A further feeding member may, e.g. be a compact disk player 12, e.g. for supplying basic data for what is to be shown on the LCD display(s). Such basic data may, e.g. comprise driving map information which may be fetched, e.g. by actuation from control panel 18.

A radio 14, if desired with an information decoder, e.g. to notify of road accidents, closed roads, speed restrictions, or the like, may be arranged to feed said micro processor 15, which presents the information in a readable manner on display 10 or 11.

A mobile telephone 19 may also be connected to micro processor 15, e.g. for transmitting messages to the driver when he is driving, or messages as to whom the driver should contact later. Via such a mobile telephone messages may be transmitted which are of importance to a job to be done, e.g. messages to a doctor driving on a sick call, to transport vehicles, police cars, etc.

The additional data feeders, designated $17_1$, $17_2$, $17_3$, $17_4$... $17_{n-1}$, $17_n$ in FIG. 4 may be scanners known per se, e.g. sensors to detect the speed of the car, the temperature of the engine, surrounding temperature, air pressure in the car tires, oil pressure, state of the brakes, door locks, rev counter, electric meter, meter of charge, etc. Furthermore, said sensors may be of the kind connected to automatic control systems for cars, position determining sensors connected to a coordinate navigation system, or sensors which may be adapted to any possible future system for driving cars.

In this manner the information desired at any time may be presented on LCD display 10, possibly on LCD display 11 as well. Display 10 may, e.g. display information for navigation to indicate how the driver should drive to get from one place to another on a map driving the shortest way. Information on oil pressure, charge, temperature, etc. is kept back, and is only presented if a dangerous condition occurs or will apparently occur. Such secondary information may, if desired, be presented on auxiliary display 11. However, it will be understood that it is not necessary to have two LCD displays, in practice one display may suffice.

When map reading information is no longer necessary, conventional information on oil pressure, temperature, charge, rev counting, etc. may again be presented on display 10.

Since micro processor 15 may either be pre-programmed or programmed by the aid of an external medium, e.g. those indicated by reference numbers 12, 13, and 14, the manufacturer of the car can in fact provide the display or instrument board of the car with the number of parameters which are desired and necessary for the car model in question. The instrument board may, thus, be identical from one car model to another, which represents great savings in production and store keeping of instrument boards for the car industry.

If there is need for further sensors at a later time, installation is readily accomplished, since such a sensor is just to be connected directly with central processor 15.

Since the disclosed display or instrument board can be made flexible, in a possible future make it may e.g. be embedded in the windscreen of the car straight in front of the driver. Such a LCD display must, of course, be of a transmissive kind. Panel 11 in FIG. 11 might be suitable for such an arrangement.

We claim:

1. A liquid crystal display panel comprising:
   curved sheet-like flexible front and rear panel members;
   a liquid crystal medium contained in a cell gap "d" between the front and rear panel members, the liquid crystal medium exhibiting anisotropy "$\Delta n$" of the index of optical refraction thereof which varies inversely with varying temperature; and
   a spacer medium provided between the front and rear panel members for maintaining the cell gap "d" therebetween uniformly equidistant, the spacer medium comprising a plurality of resilient monodisperse plastic spheres, said monodisperse plastic spheres being adhered to said front and rear panel members for establishing a fixed rigid interrelated connection therebetween by a curable adhesive-like coating provided on respective surfaces of said monodisperse plastic spheres, said monodisperse plastic spheres being reversibly deformable and having a coefficient of expansion adapted to compensate for variation in temperature of the liquid crystal medium such that the product of the quantities "d" and "$\Delta n$" (i.e., "$d.\Delta n$") is maintained constant over a temperature range of $-40°$ C. to $+90°$ C., whereby the cell gap "d" is made variable with temperature while being maintained uniformly equidistant over said temperature range to thereby compensate for temperature-dependent variation in the index of refraction of the liquid crystal medium, for enhancing the optical contrast ration of the liquid crystal display over said temperature range.

* * * * *